(12) United States Patent
Kito et al.

(10) Patent No.: US 9,718,349 B2
(45) Date of Patent: Aug. 1, 2017

(54) FUEL FEEDING DEVICE FOR VEHICLES

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 311 days.

(21) Appl. No.: 14/591,036

(22) Filed: Jan. 7, 2015

(65) Prior Publication Data
US 2015/0274008 A1 Oct. 1, 2015

(30) Foreign Application Priority Data

Mar. 27, 2014 (JP) ................................. 2014-065902
May 16, 2014 (JP) ................................. 2014-101911

(51) Int. Cl.
*F16L 9/00* (2006.01)
*B60K 15/04* (2006.01)
*F02M 37/00* (2006.01)
*F16L 3/12* (2006.01)

(52) U.S. Cl.
CPC ......... *B60K 15/04* (2013.01); *F02M 37/0017* (2013.01); *B60K 2015/0458* (2013.01); *B60K 2015/0474* (2013.01); *F16L 3/12* (2013.01)

(58) Field of Classification Search
CPC ....................... Y10T 24/3444; B60R 16/0215
USPC ....... 138/106, 107; 248/74.1, 74.2, 73, 68.1, 248/55, 71
See application file for complete search history.

(56) References Cited

U.S. PATENT DOCUMENTS

| | | | | |
|---|---|---|---|---|
| 2,948,940 A | * | 8/1960 | Degener | F16L 3/13 248/316.7 |
| 3,216,685 A | * | 11/1965 | Raymond | F16B 2/245 248/316.7 |
| 3,944,177 A | * | 3/1976 | Yoda | F16L 3/08 248/73 |
| 4,113,286 A | | 9/1978 | Kennedy, Jr. | |

(Continued)

FOREIGN PATENT DOCUMENTS

| | | |
|---|---|---|
| CH | 683204 A5 | 1/1994 |
| CH | 699642 B1 | 4/2010 |

(Continued)

OTHER PUBLICATIONS

Office Action dated Dec. 29, 2016 issued in corresponding CN patent application No. 201510084461.6.

(Continued)

*Primary Examiner* — Patrick F Brinson
(74) *Attorney, Agent, or Firm* — Posz Law Group, PLC

(57) ABSTRACT

The problem to be solved is to provide a fuel feeding device for vehicles that is stably secured to a vehicle body. In the fuel feeding device for vehicles having an inlet filler pipe 1 and a fixing member 4, a flexible element 5 is provided that relatively presses the inlet filler pipe 1 toward the fixing member 4. With the flexible element 5 causing the inlet filler pipe 1 and the fixing member 4 to make pressure contact with each other, there can hardly be any gap created between the inlet filler pipe 1 and the fixing member 4 irrespective of the difference in linear expansion coefficient between them.

3 Claims, 10 Drawing Sheets

(56) References Cited

U.S. PATENT DOCUMENTS

| | | | | |
|---|---|---|---|---|
| 4,450,605 A * | 5/1984 | Schaty | ............ | F16L 3/13 24/129 R |
| 4,470,179 A * | 9/1984 | Gollin | ............ | F16L 3/13 24/297 |
| 4,614,321 A * | 9/1986 | Andre | ............ | F16B 5/0685 24/555 |
| 4,905,942 A * | 3/1990 | Moretti | ............ | B60R 16/0215 248/68.1 |
| 4,909,462 A * | 3/1990 | Usui | ............ | F16L 3/1226 248/68.1 |
| 5,535,969 A * | 7/1996 | Duffy, Jr. | ............ | F16L 3/227 24/487 |
| 5,590,567 A * | 1/1997 | Marrs | ............ | F16C 1/105 248/67.7 |
| 5,653,411 A * | 8/1997 | Picco | ............ | F16L 3/2235 24/339 |
| 5,704,573 A * | 1/1998 | de Beers | ............ | F16L 3/237 248/73 |
| 6,216,987 B1 * | 4/2001 | Fukuo | ............ | F16L 3/227 248/229.16 |
| 6,554,232 B1 * | 4/2003 | Macris | ............ | F16B 5/0685 248/65 |
| 7,387,282 B2 * | 6/2008 | Kovac | ............ | B60R 16/0215 248/55 |
| 7,559,511 B2 * | 7/2009 | Yon | ............ | F16L 3/2235 174/135 |
| 9,109,617 B2 * | 8/2015 | Diep | ............ | F16L 3/1075 |
| 2004/0007648 A1 * | 1/2004 | Miura | ............ | F16L 3/13 248/71 |
| 2015/0377387 A1 * | 12/2015 | Meyers | ............ | B29C 45/0017 248/74.2 |

FOREIGN PATENT DOCUMENTS

| | | |
|---|---|---|
| CN | 101379334 A | 3/2009 |
| CN | 102180433 A | 9/2011 |
| CN | 103644381 A | 3/2014 |
| DE | 10 2007 020 498 B3 | 10/2008 |
| JP | 2011-133003 A | 7/2011 |
| JP | 2011-185312 A | 9/2011 |
| JP | 2013-184499 A | 9/2013 |
| WO | 2005/078326 A1 | 8/2005 |

OTHER PUBLICATIONS

Office Action dated Mar. 30, 2017 issued in corresponding JP patent application No. 2014-101911 (with English translation).

* cited by examiner

FUEL FEEDING DEVICE FOR VEHICLES

BACKGROUND OF THE INVENTION (1) Field of the Invention

The present invention relates to a fuel feeding device for vehicles mounted in a vehicle.

(2) Description of Related Art

A fuel feeding device for vehicles is a device that forms part of a fuel supply passage from a fuel inlet to a fuel tank, and generally includes an inlet filler pipe and a fixing member. FIG. 16 is a schematic representation in a perspective view of one example of a conventional fuel feeding device for vehicles, and FIG. 17 is a cross-sectional view of the conventional fuel feeding device for vehicles shown in FIG. 16 cut along a plane orthogonal to an axial direction L.

As shown in FIG. 16, the conventional fuel feeding device for vehicles includes a resin-made inlet filler pipe 1 and a metal fixing member 4. One end of the inlet filler pipe 1, or the upstream end, is attached to the fuel inlet of the vehicle (not shown), while the other end, or the downstream end, is attached to the fuel tank (not shown). Thus, the inlet filler pipe 1 forms part of a fuel supply passage. The fixing member 4 is a component for securely attaching the inlet filler pipe 1 to the vehicle body 100. In the conventional fuel feeding device for vehicles, as shown in FIG. 16 and FIG. 17, the resin-made inlet filler pipe 1 is gripped by the metal fixing member 4, and this fixing member 4 is secured to the vehicle body 100 by fastening with bolts or the like. That is, in a commonly known conventional fuel feeding device for vehicles, the inlet filler pipe 1 is secured to the vehicle body 100 via the fixing member 4. However, the resin material of the inlet filler pipe 1 and the metal material of the fixing member 4 have largely different linear expansion coefficients. Generally, resin has a higher linear expansion coefficient than metal. Since a vehicle is exposed to the outside environment, the fuel feeding device for vehicles that is mounted in the vehicle is greatly affected by temperature. In winter times, for example, the resin-made inlet filler pipe 1 undergoes a relatively large contraction, while the metal fixing member 4 does not, because of which there is a possibility that a gap may be created between the inlet filler pipe 1 and the fixing member 4. If there is a gap between the inlet filler pipe 1 and the fixing member 4, the inlet filler pipe 1 may no longer be kept stably on the fixing member 4. Even if the fixing member 4 is firmly attached to the vehicle body 100, then, the inlet filler pipe 1 on the vehicle body 100 may become loose and rattle.

JP 2011-133003 A discloses a pipe holder for securely attaching an inlet filler pipe to a vehicle body. This pipe holder is formed of two components, a holder body and an attachment bracket. The holder body is made of resin, while the attachment bracket is made of metal. The attachment bracket engages with the holder body and secures the holder body to the vehicle body. The holder body undergoes elastic deformation when engaged with the attachment bracket and grips the inlet filler pipe.

With the pipe holder of JP 2011-133003 A, as the elastically deformed holder body grips the inlet filler pipe, the holder body can stably secure the inlet filler pipe. Even so, there still remains the problem that a gap may be formed between the holder body and the attachment bracket due to a change in temperature. It is therefore still difficult to keep the holder body stably and securely on the attachment bracket, and a fuel feeding device for vehicles with an inlet filler pipe that can stably be fixed on a vehicle body is desired to be developed.

SUMMARY OF THE INVENTION

Technical Problem

The present invention has been devised in view of the circumstances described above and it is an object of the invention to provide a fuel feeding device for vehicles with an inlet filler pipe that can stably be fixed on a vehicle body.

Solution to Problem

To solve the problems described above, the fuel feeding device for vehicles according to the present invention includes an inlet filler pipe made of resin and having a fuel supply passage, a fixing member that secures the inlet filler pipe to a vehicle body, and a flexible element that relatively presses the inlet filler pipe toward the fixing member by undergoing elastic deformation to bring the inlet filler pipe into pressure contact with the fixing member.

The fuel feeding device for vehicles according to the present invention should preferably include one, or more preferably, two or more of the following features (1) to (10).

(1) The flexible element presses one or both of the inlet filler pipe and the fixing member in a direction away from the flexible element.

(2) The inlet filler pipe and the fixing member contact each other on a front side or a back side in a pressing direction of the flexible element.

(3) The inlet filler pipe includes a pipe body having the fuel supply passage, and a collar separate from the pipe body and attached to outside of the pipe body, and the flexible element is integral with the collar and relatively presses the pipe body toward the fixing member.

(4) The fuel feeding device includes an auxiliary member that grips the inlet filler pipe together with the fixing member, and the flexible element is integral with the auxiliary member and relatively presses the inlet filler pipe toward the fixing member.

(5) The fixing member has higher rigidity than the auxiliary member and is located lower than the auxiliary member.

(6) The flexible element forms part of one of the inlet filler pipe and the fixing member, and the flexible element itself makes pressure contact with the other one of the fixing member and the inlet filler pipe.

(7) The flexible element includes at least one protrusion that protrudes in a radial direction of the inlet filler pipe and elastically deforms circumferentially or axially, and the inlet filler pipe and the fixing member have a recess for holding the flexible element in a elastically deformed state.

(8) The fixing member includes a ring-like ring portion attached to an outer circumferential surface of the pipe body, and the collar is attached on an outer circumference of the ring portion.

(9) The flexible element is cantilevered and integral with one or both of the inlet filler pipe and the fixing member.

(10) The flexible element is formed of part of the inlet filler pipe in the form of bellows.

Advantageous Effects of Invention

The fuel feeding device for vehicles according to the present invention has a flexible element that relatively presses the inlet filler pipe toward the fixing member so that the inlet filler pipe and the fixing member can be brought into pressure contact with each other. Therefore, there can hardly be any gap created between the inlet filler pipe and the fixing member irrespective of the difference in linear expansion coefficient between them. Accordingly, the inlet filler pipe can be secured stably by the fixing member, consequently the inlet filler pipe can be stably secured to the vehicle body by the fixing member.

DETAILED DESCRIPTION OF PREFERRED EMBODIMENTS

Hereinafter, specific examples of the fuel feeding device for vehicles according to the present invention will be described.

First Embodiment

Figure 1:
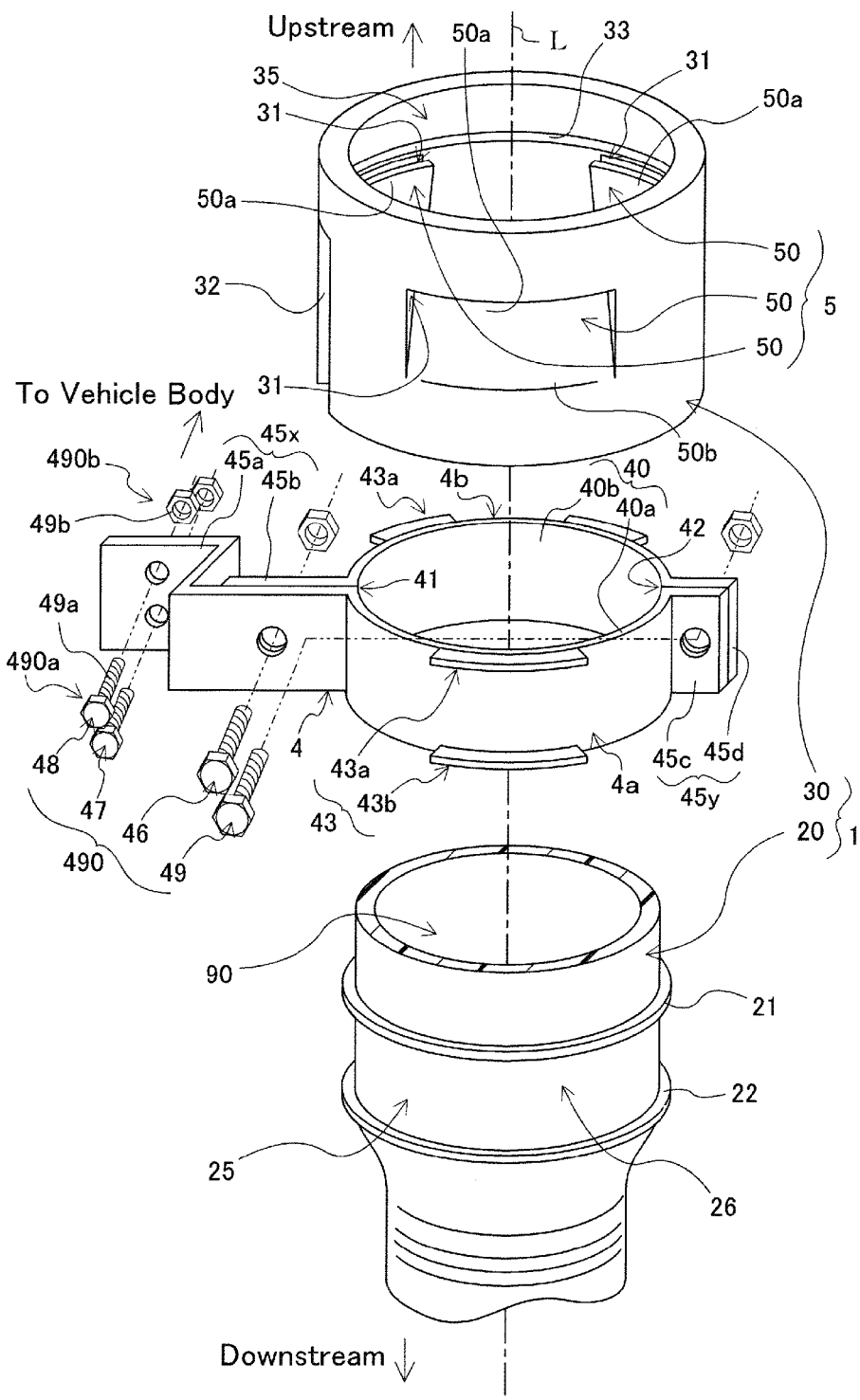
FIG. 1 is a schematic representation in an enlarged exploded perspective view of major parts of the fuel feeding device for vehicles according to First Embodiment.
Figure 2:
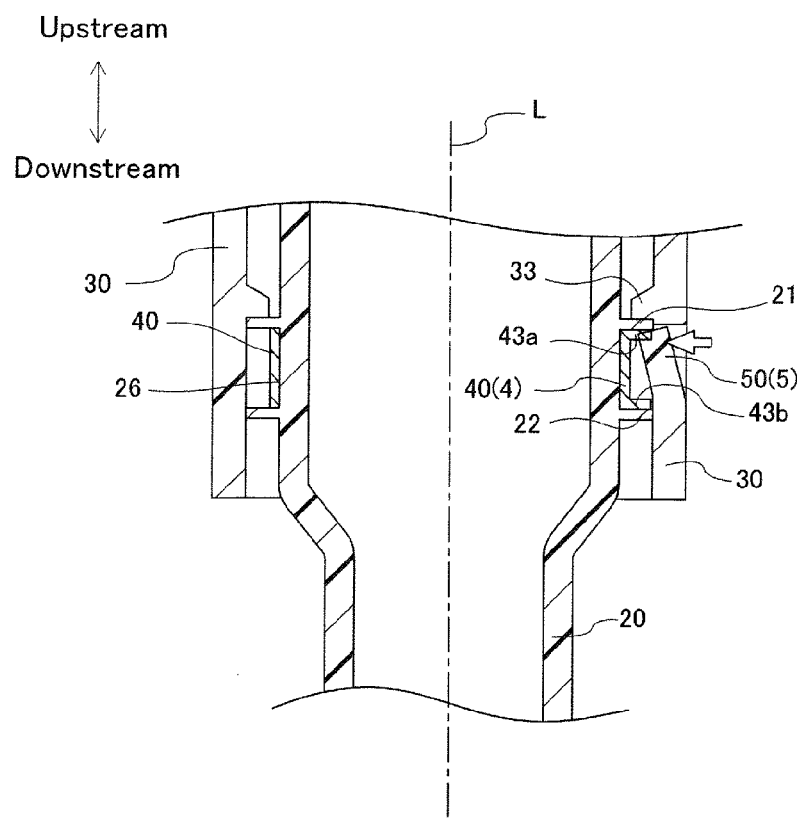
FIG. 2 is a schematic representation of an axial cross section of the fuel feeding device for vehicles according to First Embodiment.

FIG. 1 is a schematic representation in an enlarged exploded perspective view of major parts of the fuel feeding device for vehicles according to First Embodiment. FIG. 2 is a schematic representation of an axial cross section of the fuel feeding device for vehicles according to First Embodiment. In the description of embodiments below, an "axial direction" shall refer to a direction parallel to an axis line L of the inlet filler pipe shown in FIG. 1. One end in the axial direction L will be referred to as "upstream", and the other end will be referred to as "downstream". A "radial direction" refers to a direction orthogonal to the axial direction. Similarly to the conventional fuel feeding device for vehicles shown in FIG. 16 and FIG. 17, the axial direction intersects with a vertical direction. Namely, the fuel feeding device for vehicles of the embodiments is mounted to a vehicle body such as to be somewhat inclined relative to the vertical direction.

As shown in FIG. 1, the fuel feeding device for vehicles according to First Embodiment includes an inlet filler pipe 1, a fixing member 4, and a flexible element 5.

The inlet filler pipe 1 is substantially tubular and includes a pipe body 20 and a collar 30. The pipe body 20 is substantially tubular, having a fuel supply passage 90 inside. A downstream portion of the pipe body 20 is attached to a fuel tank (not shown). Two ribs (first rib 21 and second rib 22) are formed in an upstream portion of the pipe body 20. The first rib 21 is located upstream of the second rib 22. The first rib 21 and second rib 22 are axially spaced apart from each other. The first rib 21 and second rib 22 protrude radially outward from an outer circumferential surface 25 of the pipe body 20 and extend to a circumferential direction of the pipe body 20. The region between the first rib 21 and second rib 22 of the outer circumferential surface 25 of the pipe body 20 will be referred to as an "attachment area 26". A ring portion 40 of the fixing member 4 to be described later is mounted to the attachment area 26.

The collar 30 is generally tubular and shorter than the pipe body 20. The collar 30 has an inside diameter that is slightly larger than the outside diameter of the pipe body 20. The flexible element 5 is formed integral with the collar 30. The flexible element 5 is made up of three elastic pieces 50. More specifically, the collar 30 is generally cylindrical and has three windows 31 that are generally rectangular. Strip-like elastic pieces 50 are joined to the inner edges on the downstream side of the windows 31, one each to each of the windows. The upstream-side ends 50a of the elastic pieces 50 are free ends. The downstream-side ends 50b of the elastic pieces 50 are made integral with the peripheral edges of the windows 31. Thus, each elastic piece 50 is integral with the collar 30 in a cantilevered manner. The elastic pieces 50 protrude radially inward from the inlet filler pipe 1.

In other words, the composite body of the generally cylindrical collar 30 and flexible element 5 has generally inverted U-shaped cuts. The portions supported at one end that are formed by these cuts are the elastic pieces 50, the rest being the collar 30. The three elastic pieces 50 constitute the flexible element 5.

The collar 30 has an axially extending slit 32. The slit 32 opens toward the downstream side of the collar 30. The collar 30 further has a third rib 33 located somewhat upstream of the flexible element 5. The third rib 33 protrudes radially inward from an inner circumferential surface 35 of the collar 30 and extends to a circumferential direction of the collar 30. When the collar 30 is attached to the pipe body 20, the downstream end face of the third rib 33 abuts on the upstream end face of the first rib 21, as shown in FIG. 2.

As shown in FIG. 1, the fixing member 4 includes a generally ring-like ring portion 40, two tab portions 45*x* and 45*y* continuous with the ring portion 40 and extending radially outward from the ring portion 40, and four fasteners 490 that are bolts 490*a* and nuts 490*b* (first fastener 46, second fastener 47, third fastener 48, and fourth fastener 49).

The ring portion 40 is formed of two generally C-shaped split halves (first ring half 40*a* and second ring half 40*b*) joined together and is generally ring-like.

The tab portion 45*x* is formed of two split tabs 45*a* and 45*b*. One split tab 45*a* is continuous with one circumferential end of the first ring half 40*a* (i.e., one open end 41 of the ring portion 40). The other split tab 45*b* is continuous with one circumferential end of the second ring half 40*b* (i.e., the open end 41 of the ring portion 40).

The tab portion 45*y* is formed of two split tabs 45*c* and 45*d*. One split tab 45*c* is continuous with the other circumferential end of the first ring half 40*a* (i.e., the other open end 42 of the ring portion 40). The other split tab 45*d* is continuous with one circumferential end of the second ring half 40*b* (i.e., the open end 42 of the ring portion 40). Namely, the fixing member 4 is made of two split halves (first split half 4*a* and second split half 4*b*). The first split half 4*a* includes the first ring half 40*a*, split tab 45*a*, split tab 45*c*, and two protruding strips 43 to be described later. The second split half 4*b* includes the second ring half 40*b*, split tab 45*b*, split tab 45*d*, and four protruding strips 43 to be described later.

As shown in FIG. 1, the fixing member 4 is fixedly attached to a vehicle body 100 by means of the second fastener 47 and third fastener 48. The two split tabs 45*a* and 45*b* are fastened together by the first fastener 46, while the two split tabs 45*c* and 45*d* are fastened together by the fourth fastener 49. The first ring half 40*a* and second ring half 40*b* are thus joined together to form the ring-like ring portion 40. The first split half 4*a* and second split half 4*b* are united to form the fixing member 4. The inside diameter of the ring portion 40 is slightly smaller than the outside diameter of the attachment area 26 of the pipe body 20, so that the first split half 4*a* and second split half 4*b*, being fastened together by the first fastener 46 and fourth fastener 49, grip the pipe body 20.

The ring portion 40 has six protruding strips 43 protruding radially outward from the ring portion 40. Three protruding strips 43*a* are circumferentially arranged in an upstream portion of the ring portion 40. These three protruding strips 43*a* are spaced apart from each other. Other three protruding strips 43*b* are circumferentially arranged in a downstream portion of the ring portion 40. These three protruding strips 43*b* are also spaced apart from each other. The upstream-side protruding strips 43*a* and downstream-side protruding strips 43*b* are axially opposite to each other. The axial length of the ring portion 40 is the same (or substantially the same) as the axial length of the attachment area 26 of the pipe body 20. The first ring half 40*a* has one protruding strip 43*a* and one protruding strip 43*b*, while the second ring half 40*b* has two protruding strips 43*a* and two protruding strips 43*b*.

As shown in FIG. 2, the ring portion 40 of the fixing member 4 is attached on the outer circumference in the attachment area 26 of the pipe body 20. The collar 30 is attached further on the outer circumference of the ring portion 40. The tab portion 45 of the fixing member 4 is inserted into the slit 32 of the collar 30. Thus, the ring portion 40 of the fixing member 4 is disposed inside the collar 30, while the tab portion 45 is exposed outside of the collar 30 through the slit 32.

Since the inside diameter of the ring portion 40 is slightly smaller than the outside diameter of the attachment area 26 of the pipe body 20 as mentioned above, the ring portion 40 is entirely increased in diameter when attached to the pipe body 20 and makes tight contact with the attachment area 26 by its own elasticity. The ring portion 40 is axially positioned by the first rib 21 and second rib 22.

When the collar 30 is attached to the pipe body 20 and the ring portion 40, the three elastic pieces 50 each face one of the protruding strips 43*a*. Since each elastic piece 50 protrudes radially inward from the collar 30 (i.e., toward the ring portion 40), while each protruding strip 43 protrudes radially outward from the ring portion 40 (i.e., toward the collar 30), each elastic piece 50 interferes with each protruding strip 43. Thus the elastic pieces 50 undergo elastic deformation (or flexible deformation) and make pressure contact with the respective protruding strips 43.

Namely, the flexible element 5 formed of the three elastic pieces 50 presses the ring portion 40 of the fixing member 4 radially inward so that the ring portion 40 makes pressure contact with the pipe body 20 that is located radially on the inner side of the ring portion 40. In other words, the flexible element 5 presses the pipe body 20 of the inlet filler pipe 1 toward the ring portion 40 of the fixing member 4, in a relative sense, to bring the pipe body 20 into pressure contact with the ring portion 40.

At this time, on the front side in the pressing direction of the flexible element 5, i.e., on the radially inner side of the collar 30, the ring portion 40 makes surface contact with the pipe body 20, as shown in FIG. 2. Thus the ring portion 40 makes pressure contact with the pipe body 20 in a wide area, so that the inlet filler pipe 1 is stably secured to the fixing member 4. While the ring portion 40 makes surface contact with the pipe body 20 in the fuel feeding device for vehicles of First Embodiment, they may make point contact, or line contact, with each other.

Since the flexible element 5 is cantilevered, the flexible element 5 that brings the inlet filler pipe 1 into pressure contact with the fixing member 4 can be simply configured, which provides the advantage of allowing production of the fuel feeding device for vehicles at lower cost. The cantilevered flexible element 5 may be formed of part of the inlet filler pipe 1 as in the fuel feeding device for vehicles of First Embodiment, or, instead, it may be formed of part of the fixing member 4, for example.

In the fuel feeding device for vehicles of First Embodiment, the inlet filler pipe 1 is formed of two components, the pipe body 20 and the collar 30, so that the flexible element 5 can readily be formed integrally with the inlet filler pipe 1. Namely, if the flexible element 5 is to be formed integrally with the resin-made inlet filler pipe 1, the composite body of the inlet filler pipe 1 and the flexible element 5 will have a complex shape, and it may be necessary, depending on the shape, to provide a complex mechanism such as a slide core or the like in the molds for forming such a composite body. If the inlet filler pipe 1 is formed of two separate components, however, and the flexible element 5 is to be formed integrally with one of the components, then the mold design may be made relatively simple, leading to the advantage of allowing production of such composite body at low cost.

Since the fixing member 4 is formed of two components, the first split half 4a and second split half 4b, the fixing member 4 can be formed precisely to the intended dimension and easily, even if the fixing member 4 has a relatively complex shape.

In the fuel feeding device for vehicles of First Embodiment, the flexible element 5 presses the fixing member 4 toward the inlet filler pipe 1, so that the fixing member 4 and inlet filler pipe 1 make pressure contact with each other. Therefore, even if the fuel feeding device for vehicles of First Embodiment is subjected to high temperature and the metal fixing member 4 expands, the flexible element 5 pressing the fixing member 4 toward the inlet filler pipe 1 keeps the fixing member 4 in pressure contact with the inlet filler pipe 1. Therefore, a gap is unlikely to be created between them. Accordingly, in the fuel feeding device for vehicles of First Embodiment, the inlet filler pipe 1 is stably secured to the vehicle body 100.

While the flexible element 5 is formed of three elastic pieces 50 in the fuel feeding device for vehicles of First Embodiment, the flexible element 5 may be formed of only one elastic piece 50. The protruding strips 43 may be omitted, and the flexible element 5 may directly abut on the circumferential wall of the ring portion 40.

While the flexible element 5 is integral with the collar 30 and presses the ring portion 40 of the fixing member 4 toward the pipe body 20 in the fuel feeding device for vehicles of First Embodiment, the flexible element 5 may not necessarily be made integral with the collar 30. For example, the flexible element 5 may be integral with the attachment area 26 of the pipe body 20, to press the ring portion 40 toward the collar 30. In this case, the flexible element 5 and the collar 30 grip the fixing member 4, and the flexible element 5 and the collar 30 are stably secured to the fixing member 4. The pipe body 20, which is integral with the flexible element 5, is also stably secured to the fixing member 4. In this case, the ring portion 40 makes surface contact with the collar 30 on the front side in the pressing direction of the flexible element 5, i.e., on the radially outer side of the pipe body 20. Thus the ring portion 40 makes pressure contact with the collar 30 in a wide area.

Second Embodiment

Figure 3:
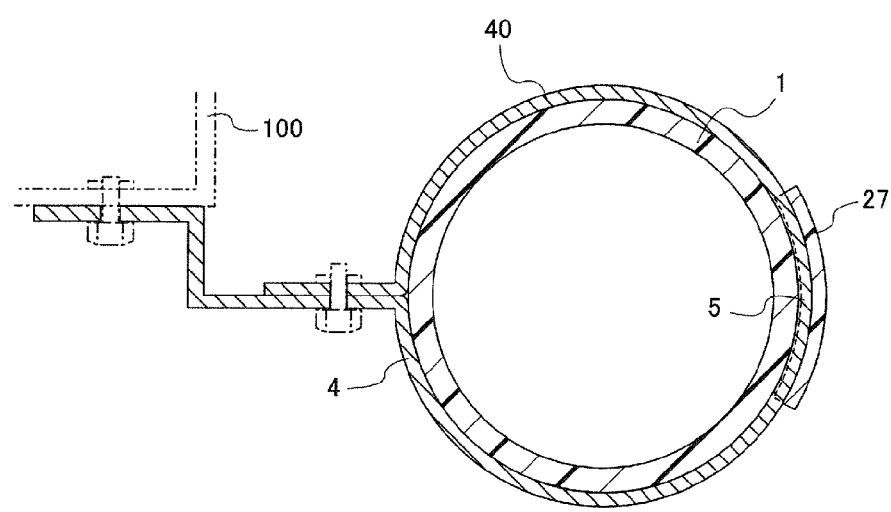
FIG. 3 is a schematic representation of a radial cross section of the fuel feeding device for vehicles according to Second Embodiment.
Figure 4:
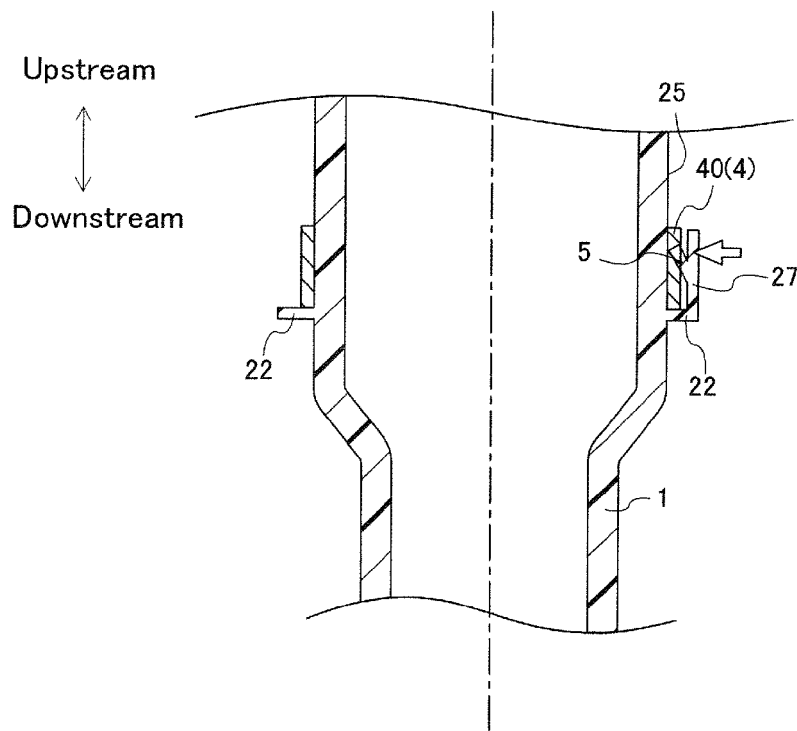
FIG. 4 is a schematic representation of an axial cross section of the fuel feeding device for vehicles according to Second Embodiment.

FIG. 3 is a schematic representation of a radial cross section of the fuel feeding device for vehicles according to Second Embodiment. FIG. 4 is a schematic representation of an axial cross section of the fuel feeding device for vehicles according to Second Embodiment.

The inlet filler pipe 1 in the fuel feeding device for vehicles of Second Embodiment does not have the collar 30. The inlet filler pipe 1 in the fuel feeding device for vehicles of Second Embodiment is generally the same as the pipe body 20 in the fuel feeding device for vehicles of First Embodiment, but differs in the following points: Namely, the inlet filler pipe 1 in the fuel feeding device for vehicles of Second Embodiment has the second rib 22 but does not have the first rib 21, as shown in FIG. 4. As shown in FIG. 3, the second rib 22 is provided circumferentially only partly to the inlet filler pipe 1. As shown in FIG. 4, the second rib 22 is provided with an upright holder portion 27 that axially protrudes toward the upstream side, and the flexible element 5 is made integral with this holder portion 27. More specifically, the flexible element 5 is integral with the radially inner surface of the holder portion 27, i.e., the surface of the holder portion 27 that faces the outer circumferential surface of the inlet filler pipe 1. The flexible element 5 protrudes radially inward from the holder portion 27.

The fixing member 4 is the same as the fixing member 4 in the fuel feeding device for vehicles of First Embodiment except that it does not have protruding strips 43 and is made from one component generally in the form of a C-shaped ring.

As shown in FIG. 4, the ring portion 40 of the fixing member 4 is arranged upstream of the second rib 22 to be positioned by the second rib 22. The ring portion 40 is sandwiched between the outer circumferential surface 25 of the inlet filler pipe 1 and the holder portion 27, and pressed by the flexible element 5 toward the outer circumferential surface 25 of the inlet filler pipe 1. Thus, the ring portion 40 makes pressure contact with the inlet filler pipe 1. The inner circumferential surface of the ring portion 40 makes surface contact with the outer circumferential surface of the inlet filler pipe 1 on the front side in the pressing direction of the flexible element 5. Accordingly, the inlet filler pipe 1 is stably secured to the fixing member 4 in the fuel feeding device for vehicles of Second Embodiment, too, and is stably secured to the vehicle body 100 via the fixing member 4.

While the flexible element 5 is integral with the holder portion 27 in Second Embodiment, the flexible element 5 may be made integral with the outer circumferential surface 25 of the inlet filler pipe 1. In this case, the flexible element 5 presses the ring portion 40 of the fixing member 4 toward the holder portion 27. The ring portion 40 is gripped by the flexible element 5 and the holder portion 27, and makes pressure contact with the holder portion 27. The holder portion 27 makes surface contact with the ring portion 40 on the front side in the pressing direction of the flexible element 5. Accordingly, in this case, too, the inlet filler pipe 1 is stably secured to the fixing member 4, and is stably secured to the vehicle body 100 via the fixing member 4.

Alternatively, the flexible element 5 may be made integral with either an outer or inner circumferential surface of the ring portion 40 of the fixing member 4, instead of the inlet filler pipe 1. In this case, the flexible element 5 presses the fixing member 4 toward the outer circumferential surface 25 of the inlet filler pipe 1 or the holder portion 27. Therefore, in this case, too, as the fixing member 4 and the inlet filler pipe 1 make pressure contact with each other, the inlet filler pipe 1 is stably secured to the fixing member 4, and is stably secured to the vehicle body 100 via the fixing member 4.

Third Embodiment

Figure 5:
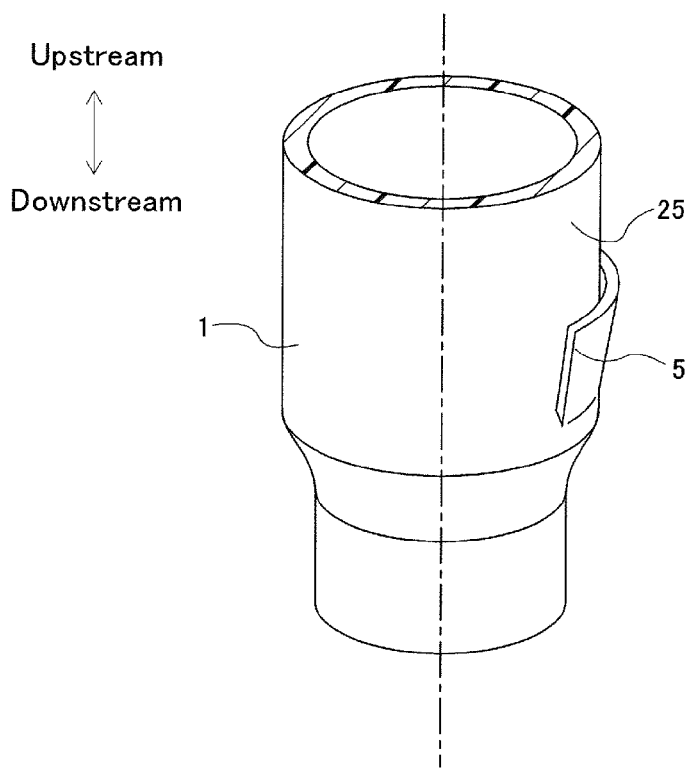
FIG. 5 is a schematic representation in an enlarged perspective view of major parts of an inlet filler pipe in the fuel feeding device for vehicles according to Third Embodiment.
Figure 6:
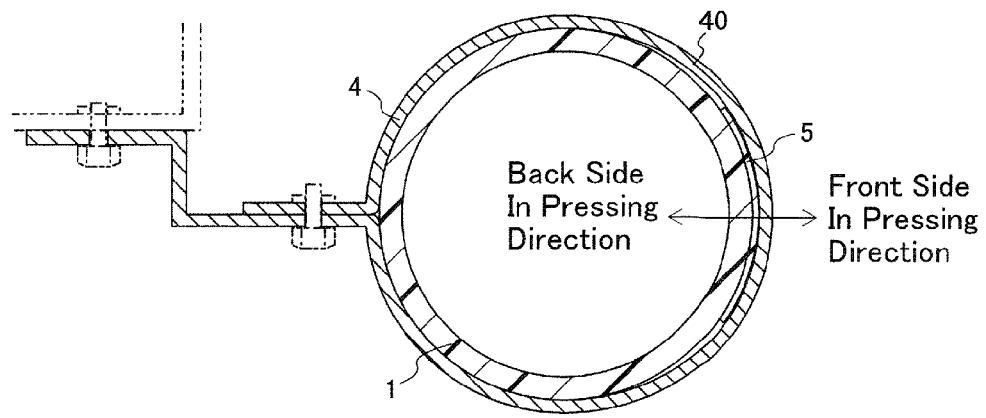
FIG. 6 is a schematic representation of a radial cross section of the fuel feeding device for vehicles according to Third Embodiment.

FIG. 5 is a schematic representation in an enlarged perspective view of major parts of an inlet filler pipe 1 in the fuel feeding device for vehicles according to Third Embodiment. FIG. 6 is a schematic representation of a radial cross section of the fuel feeding device for vehicles according to Third Embodiment.

The inlet filler pipe 1 in the fuel feeding device for vehicles of Third Embodiment is generally the same as the inlet filler pipe 1 in the fuel feeding device for vehicles of Second Embodiment, but differs in the following points: Namely, the inlet filler pipe 1 in the fuel feeding device for vehicles of Third Embodiment does not have the second rib 22, and the flexible element 5 is made directly integral with the outer circumferential surface 25 of the inlet filler pipe 1. As shown in FIG. 5, the flexible element 5 is made integral with the outer circumferential surface 25 of the inlet filler pipe 1 circumferentially and protrudes radially outward from the inlet filler pipe 1 and toward the upstream of the inlet filler pipe 1. The flexible element 5 is curved and plate-like. The fixing member 4 is the same as the fixing member 4 in the fuel feeding device for vehicles of Second Embodiment.

As shown in FIG. 6, the ring portion 40 is attached on the outer circumference of the flexible element 5. The flexible element 5 itself makes pressure contact with the ring portion 40 and presses the ring portion 40 radially outward of the inlet filler pipe 1. This, in a relative sense, pulls the whole ring portion 40 toward the front side in the pressing direction of the flexible element 5. Put differently, the inlet filler pipe 1 is pressed toward the back side in the pressing direction of the flexible element 5 by the reaction force against the pressure exerted on the ring portion 40 by the flexible element 5.

Thereby, the ring portion 40 makes pressure contact with the inlet filler pipe 1 on the back side in the pressing direction of the flexible element 5. Accordingly, the inlet filler pipe 1 is stably secured to the fixing member 4 in the fuel feeding device for vehicles of Third Embodiment, too, and is stably secured to the vehicle body 100 via the fixing member 4. In the fuel feeding device for vehicles of Third Embodiment, the inner circumferential surface of the ring portion 40 makes surface contact with the outer circumferential surface of the inlet filler pipe 1 on the back side in the pressing direction of the flexible element 5. With the inner circumferential surface of the ring portion 40 and the outer circumferential surface of the inlet filler pipe 1 making surface contact with each other, the inlet filler pipe 1 can be secured to the fixing member 4 more stably.

Figure 7:
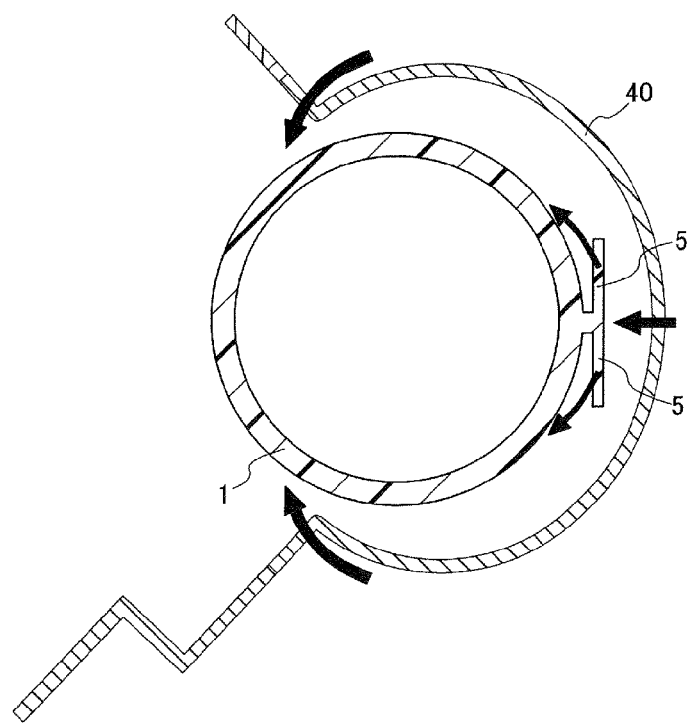
FIG. 7 shows variation examples of the inlet filler pipe and a flexible element in the fuel feeding device for vehicles according to Third Embodiment.

In this case, the flexible element 5 only has to protrude at least radially outward from the inlet filler pipe 1. For example, the flexible element 5 may protrude radially outward from the inlet filler pipe 1 and toward the downstream. Alternatively, as shown in a radial cross section in FIG. 7, the flexible element 5 may be integral with the inlet filler pipe 1 to extend axially along the inlet filler pipe 1 and protrude radially outward from the inlet filler pipe 1. In this case, too, the ring portion 40 is attached on the outer circumference of the flexible element 5 and presses the flexible element 5 toward the inlet filler pipe 1. The flexible element 5 undergoes elastic deformation toward the inlet filler pipe 1 as it is pressed by the ring portion 40 as indicated by the arrows in FIG. 7. The flexible element 5 at this time presses the ring portion 40 radially outward of the inlet filler pipe 1 by its own elasticity. Thus, as with the fuel feeding device for vehicles of Third Embodiment, the ring portion 40 makes pressure contact with the inlet filler pipe 1 on the back side in the pressing direction of the flexible element 5.

Fourth Embodiment

Figure 8:
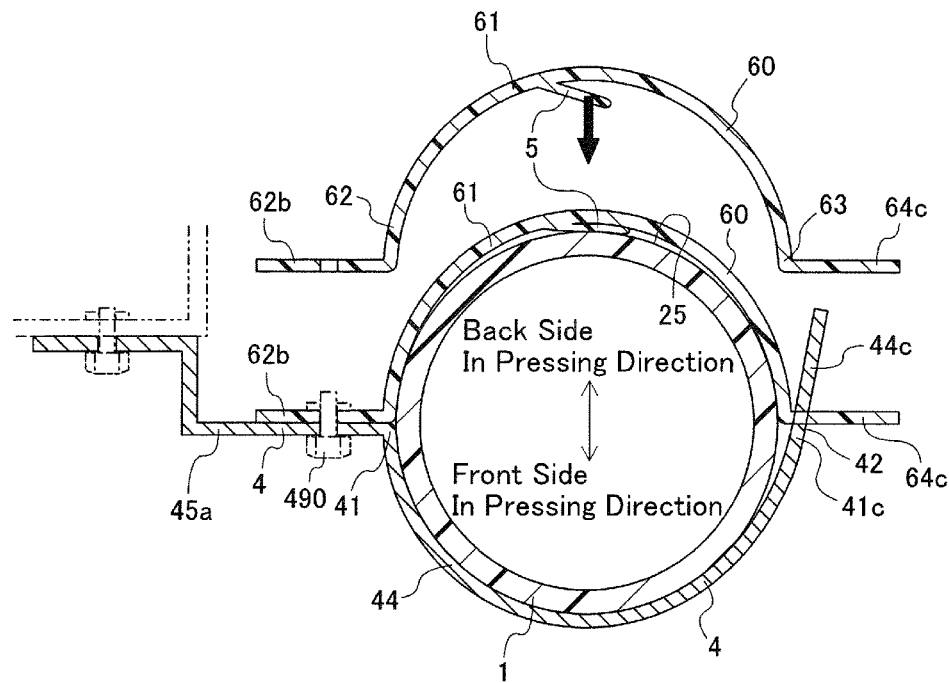
FIG. 8 is a schematic explanatory diagram of a radial cross section of a fuel feeding device for vehicles according to Fourth Embodiment.

FIG. 8 is a schematic representation of a radial cross section of the fuel feeding device for vehicles according to Fourth Embodiment.

The inlet filler pipe 1 in the fuel feeding device for vehicles of Fourth Embodiment is generally the same as the inlet filler pipe 1 in the fuel feeding device for vehicles of Third Embodiment, except that the flexible element 5 is not integral with the pipe. As shown in FIG. 8, the fixing member 4 includes a generally open C-shaped ring half 44, a split tab 45a continuous with one open end 41 of the ring half 44, and a coupling portion 44c continuous with the other open end 42 of the ring half 44. A resin-made auxiliary member 60 is fixed to the fixing member 4. The auxiliary member 60 includes an auxiliary ring half 61 which is generally open C-shaped as with the ring half 44, an auxiliary split tab 62b continuous with one open end 62 of the auxiliary ring half 61, and an auxiliary coupling portion 64c continuous with the other open end 63 of the auxiliary ring half 61. With the coupling portion 44c and the auxiliary coupling portion 64c fitted to each other, the fixing member 4 and the auxiliary member 60 are joined together. The ring half 44 and the auxiliary ring half 61 are attached on the outer circumference of the inlet filler pipe 1. The split tab 45a and the auxiliary split tab 62b are fastened together by a fastener 490. Accordingly, the inlet filler pipe 1 is gripped and secured by the fixing member 4 and the auxiliary member 60 in the fuel feeding device for vehicles of Fourth Embodiment.

The flexible element 5 is integral with the surface of the auxiliary ring half 61 that faces the outer circumferential surface 25 of the inlet filler pipe 1. The flexible element 5 protrudes toward the inlet filler pipe 1. Therefore, the flexible element 5 presses the outer circumferential surface 25 of the inlet filler pipe 1, i.e., indirectly presses the fixing member 4 via the inlet filler pipe 1, to bring the inlet filler pipe 1 and the fixing member 4 into pressure contact with each other on the front side in the pressing direction. At this time, the inlet filler pipe 1 and the fixing member 4 make surface contact with each other. Accordingly, the inlet filler pipe 1 is stably secured to the fixing member 4 in the fuel feeding device for vehicles of Fourth Embodiment, too, and is stably secured to the vehicle body 100 via the fixing member 4. The auxiliary member 60 is made of resin, which can contribute to a weight reduction of the fuel feeding device for vehicles.

Figure 16:
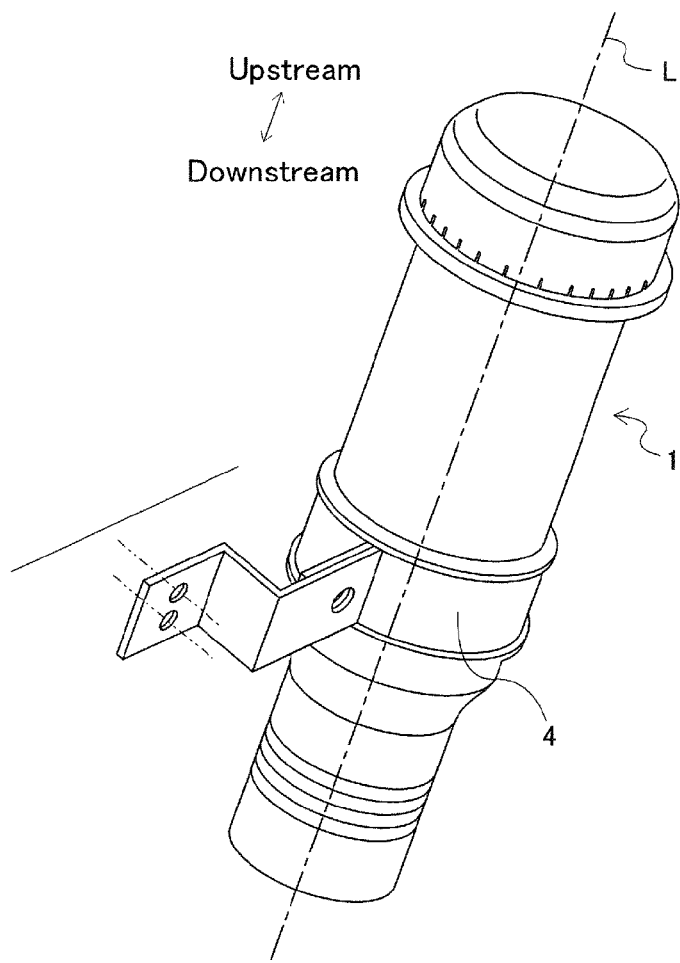
FIG. 16 is a schematic representation in a perspective view of one example of a conventional fuel feeding device for vehicles.
Figure 17:
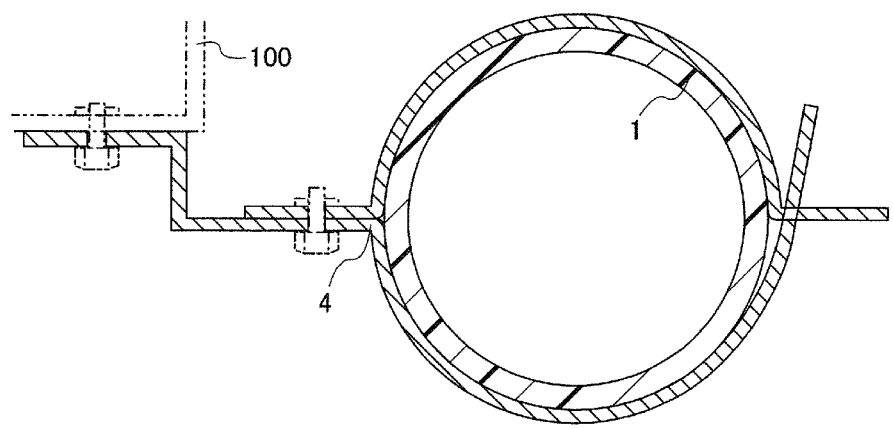
FIG. 17 is a cross-sectional view of the conventional fuel feeding device for vehicles shown in FIG. 16 cut along a plane orthogonal to an axial direction L.

The fuel feeding devices for vehicles of First Embodiment to Fourth Embodiment are mounted to the vehicle body 100 such as to be somewhat inclined relative to the vertical direction, as with the conventional fuel feeding device for vehicles shown in FIG. 16 and FIG. 17. Therefore, the fixing member 4 is located lower than the auxiliary member 60. During feeding of fuel, a fuel feeding gun is inserted into the inlet filler pipe 1. The weight of the fuel feeding gun is then applied to the inlet filler pipe 1. The inlet filler pipe 1 is therefore pressed downward, i.e., toward the fixing member 4. Since the fixing member 4 is made of metal, it has higher rigidity than the resin-made auxiliary member 60. Therefore, the fixing member 4 can stably support the inlet filler pipe 1.

Sometimes the fixing member 4 may be subjected to a large load exerted by the inlet filler pipe 1 itself when the inlet filler pipe 1 has a large weight or when the car is running on a rough road. Even so, since the fixing member 4 in the fuel feeding device for vehicles of Fourth Embodiment has high rigidity, the inlet filler pipe 1 can be retained stably.

If the flexible element 5 is integral with the auxiliary member 60 and makes contact with the inlet filler pipe 1 as in the fuel feeding device for vehicles of Fourth Embodiment, preferably, the flexible element 5 and the auxiliary member 60 should both be made of resin. Since the flexible element 5 contacts the inlet filler pipe 1 in a small area, making the flexible element 5 from a soft material (i.e., resin) provides the advantage of reducing scratches on the inlet filler pipe 1 that may be caused by the flexible element 5.

Fifth Embodiment

Figure 9:
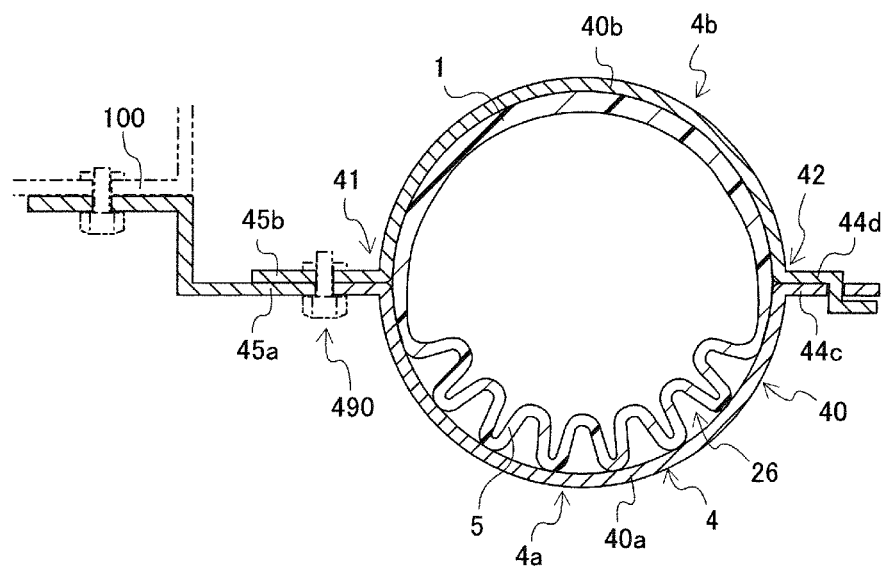
FIG. 9 is a schematic representation of a radial cross section of a fuel feeding device for vehicles according to Fifth Embodiment.

FIG. 9 is a schematic representation of a radial cross section of the fuel feeding device for vehicles according to Fifth Embodiment.

The inlet filler pipe 1 in the fuel feeding device for vehicles of Fifth Embodiment does not have the collar 30. A circumferential region in the attachment area 26 of the inlet filler pipe 1 folds radially inward and outward in a bellows shape. This region is the flexible element 5 in the fuel feeding device for vehicles of Fifth Embodiment.

A ring portion 40 of the fixing member 4 is mounted to the attachment area 26. Namely, the fixing member 4 is made of two split halves (first split half 4a and second split half 4b). The first split half 4a includes a generally open C-shaped first ring half 40a, a split tab 45a continuous with one open end 41 of the first ring half 40a, and a coupling portion 44c continuous with the other open end 42 of the first ring half 40a. Similarly, the second split half 4b includes a second ring half 40b, a split tab 45b, and a coupling portion 44d. The coupling portion 44c of the first split half 4a is fitted to the coupling portion 44d of the second split half 4b. With the two coupling portions 44c and 44d fitted to each other, the first split half 4a and the second split half 4b are joined together. The first split half 4a and the second split half 4b are attached on the outer circumference of the inlet filler pipe 1. The split tab 45a and the split tab 45b are fastened together by a fastener 490.

The inlet filler pipe 1 in the fuel feeding device for vehicles of Fifth Embodiment is generally the same as the inlet filler pipe 1 in the fuel feeding device for vehicles of Third Embodiment, but differs in that the flexible element 5 is formed of part of the inlet filler pipe 1 in a bellows shape, as described above.

When the inlet filler pipe 1 is attached to the fixing member 4, the flexible element 5 is elastically deformed in the circumferential direction of the inlet filler pipe 1, in a direction in which the bellows contract (i.e., radially contracting direction). Therefore, the flexible element 5 at this time makes pressure contact with the fixing member 4 by its own elasticity. The remaining part of the inlet filler pipe 1 other than the flexible element 5 also attempts to increase in diameter with the flexible element 5 so that it makes pressure contact with the fixing member 4 by the elasticity of the flexible element 5. Accordingly, in the fuel feeding device for vehicles of Fifth Embodiment, too, the inlet filler pipe 1 is pressed against the fixing member 4 by the flexible element 5. The pressure thus exerted keeps the inlet filler pipe 1 and the fixing member 4 in pressure contact with each other. Accordingly, the inlet filler pipe 1 is stably secured to the vehicle body 100 via the fixing member 4 in the fuel feeding device for vehicles of Fifth Embodiment, too.

The bellows-like flexible element 5 is provided in an upstream portion of the fuel supply passage of the inlet filler pipe 1 (i.e., a portion on the side of the inlet, hereinafter referred to as "inlet part 11") in Fifth Embodiment. Instead, as with Sixth Embodiment to be described later, the flexible element may be provided in a downstream portion of the fuel supply passage of the inlet filler pipe 1 (i.e., a portion on the side of the fuel tank, hereinafter referred to as "body part 12").

Figure 10:
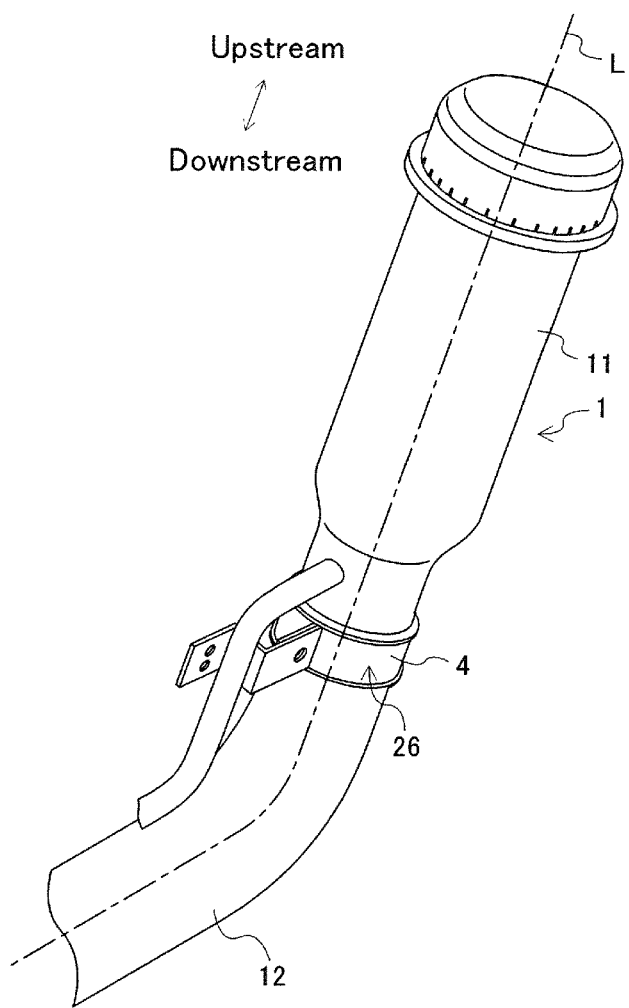
FIG. 10 is a schematic representation in an enlarged perspective view of major parts of a fuel feeding device for vehicles according to Sixth Embodiment.

Generally, as shown in FIG. 10, the inlet part 11 has a relatively complex shape, while the body part 12 has a relatively simple shape. Therefore, when fabricating the inlet filler pipe 1 by molding resin, it is usual to use different molding methods for making the inlet part 11 and the body part 12. Namely, the inlet part 11 should be made by a high-precision molding method and is usually formed by injection molding. On the other hand, a molding technique that uses less precise but inexpensive molds should be used to fabricate the body part 12 and it is usually made by extrusion molding or blow molding. Therefore, if the inlet filler pipe 1 is to be provided with a flexible element 5, and if the flexible element 5 has a complex shape, it may preferably be provided to the inlet part 11, while, if the flexible element 5 has a simple shape, it may preferably be provided to the body part 12. The flexible element 5 in the fuel feeding device for vehicles of Fifth Embodiment has a relatively simple shape, and so it may be provided to the inlet part 11, or to the body part 12.

The bellows-like flexible element 5 can undergo a relatively large deformation. Therefore, the flexible element 5 of this type can cause the inlet filler pipe 1 and the fixing member 4 to make firm pressure contact with each other, thus providing the advantage that the inlet filler pipe 1 is stably secured to the fixing member 4.

Sixth Embodiment

Figure 11:
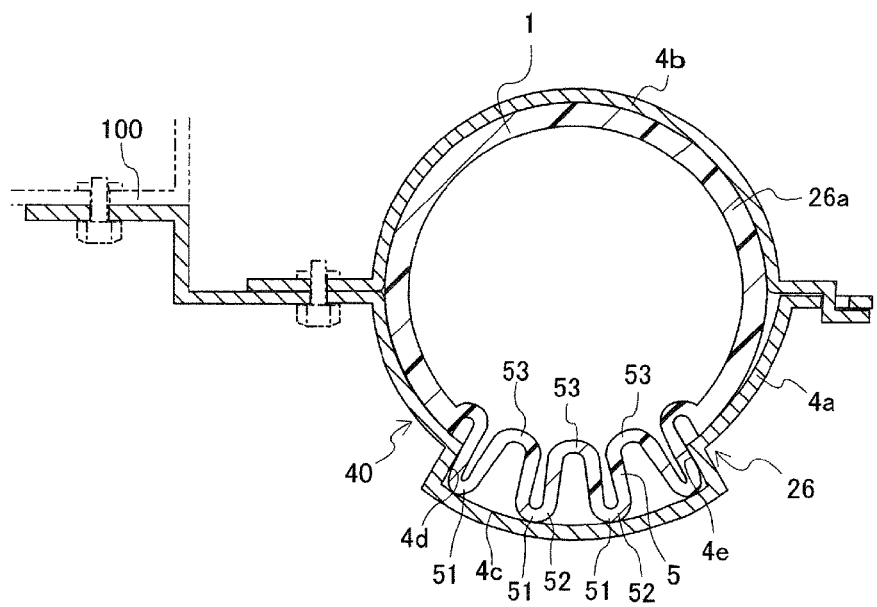
FIG. 11 is a schematic representation of a radial cross section of the fuel feeding device for vehicles according to Sixth Embodiment.

FIG. 10 is a schematic representation in an enlarged perspective view of major parts of the fuel feeding device for vehicles according to Sixth Embodiment. FIG. 11 is a schematic representation of a radial cross section of the fuel feeding device for vehicles according to Sixth Embodiment.

The flexible element 5 in the fuel feeding device for vehicles according to Sixth Embodiment is provided not to the inlet part 11 but to the body part 12. The body part 12 is continuous with the downstream side of the fuel supply passage of the inlet part 11, somewhat smaller in diameter than the inlet part 11, and curved. The fixing member 4 in the fuel feeding device for vehicles of Sixth Embodiment is attached on the outer circumference of the body part 12. The attachment area 26 is provided in the body part 12, and part of the attachment area 26 forms the flexible element 5. More specifically, the flexible element 5 is formed of a circumferential region in the attachment area 26 of the inlet filler pipe 1 that folds radially inwards and outward in a bellows shape. Hereinafter, the remaining part of the attachment area 26 other than the flexible element 5 will be referred to as "general attachment area 26a". The outer peripheral end 51 of the flexible element 5 (i.e., the radially distal end of the flexible element 5) protrudes radially outward more than the general attachment area 26a.

The fixing member 4 is generally the same as the fixing member 4 in the fuel feeding device for vehicles of Fifth Embodiment except that it has a recess 4c for accommodating and holding the flexible element 5. The recess 4c is provided in the ring portion 40 of the fixing member 4. The fixing member 4 is formed of two split halves (first split half 4a and second split half 4b) as with the fixing member 4 in the fuel feeding device for vehicles of Fifth Embodiment. The recess 4c is provided in the first split half 4a. More specifically, the recess 4c is formed of a circumferential part of the ring portion 40. The recess 4c is concave when viewed from the radially inner side of the ring portion 40, and convex when viewed from the radially outer side of the ring portion 40. The ring portion 40 of the fixing member 4 is attached on the outer circumference of the flexible element 5 and the general attachment area 26a. In other words, the flexible element 5 and the general attachment area 26a are accommodated and held on the inner circumference of the ring portion 40. The bellows-like flexible element 5 that is circumferentially elastically deformed to contract is held inside the recess 4c of the ring portion 40. A surface of the flexible element 5 makes pressure contact with each of the two circumferential end faces 4d and 4e that are the inner faces of the recess 4c. In other words, the flexible element 5 makes elastic engagement with the recess 4c.

In the fuel feeding device for vehicles of Sixth Embodiment, the flexible element 5 that is part of the inlet filler pipe 1, and the recess 4c that is part of the fixing member 4 make pressure contact and elastic engagement with each other. With the flexible element 5 and the recess 4c elastically engaging with each other, the inlet filler pipe 1 is stably secured to the vehicle body 100 via the fixing member 4 in the fuel feeding device for vehicles of Sixth Embodiment.

The flexible element 5 is provided to the body part 12 of the inlet filler pipe 1 in the fuel feeding device for vehicles according to Sixth Embodiment. Since the bellows-like flexible element 5 has a relatively simple shape, the flexible element 5 can be formed readily by blow molding together with other part of the body part 12 (such as, for example, the general attachment area 26a). Therefore, the inlet filler pipe 1 in the fuel feeding device for vehicles of Sixth Embodiment can be produced inexpensively since it does not require complex shaped molds such as those with slide cores.

While a bellows-like flexible element 5 is provided to the inlet filler pipe 1 and the recess 4c is provided to the fixing member 4 in the fuel feeding device for vehicles of Sixth Embodiment, the bellows-like flexible element 5 may be provided to the fixing member 4 and the recess 4c may be provided to the inlet filler pipe 1.

While the flexible element 5 in the fuel feeding device for vehicles of Sixth Embodiment has a bellows-like shape wherein ridges 52 and valleys 53 alternately protrude radially outward and inward of the inlet filler pipe 1, the flexible element 5 with a protrusion may have other shapes than the bellows-like shape. For example, the flexible element 5 may have only a protrusion that can undergo elastic deformation. In this case, the elastically deformed protrusion, or the flexible element 5, may be accommodated in the recess 4c, in an elastically deformed state, to make pressure contact with the recess 4c by the elasticity of the flexible element 5 itself. The flexible element 5 may be formed of only one protrusion, or a plurality of protrusions. In this case, too, the flexible element 5 may be provided to the fixing member 4 and the recess 4c may be provided to the inlet filler pipe 1.

Seventh Embodiment

Figure 12:
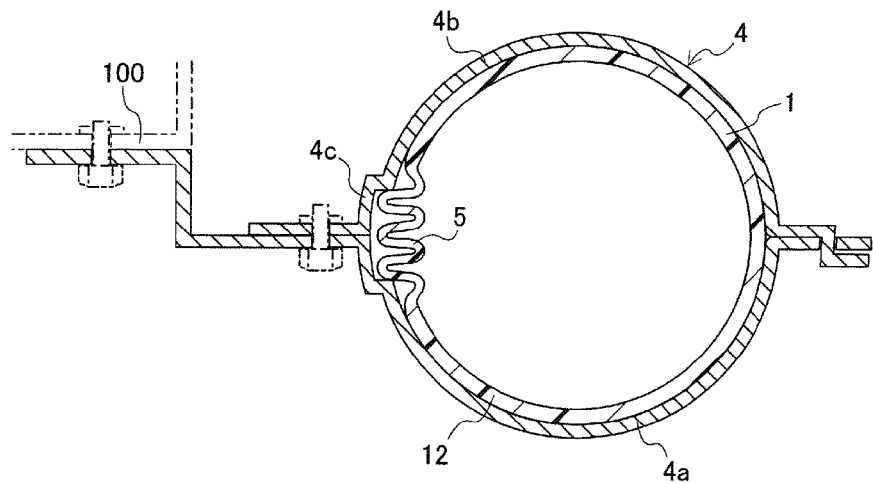
FIG. 12 is a schematic representation of a radial cross section of a fuel feeding device for vehicles according to Seventh Embodiment.

FIG. 12 is a schematic representation of a radial cross section of the fuel feeding device for vehicles according to Seventh Embodiment.

The fixing member 4 in the fuel feeding device for vehicles of Seventh Embodiment is generally the same as the fixing member 4 in the fuel feeding device for vehicles of Sixth Embodiment except for the position of the recess 4c. The recess 4c in the fuel feeding device for vehicles of Seventh Embodiment is provided to extend across the first split half 4a and the second split half 4b of the fixing member 4. The inlet filler pipe 1 in the fuel feeding device for vehicles of Seventh Embodiment is generally the same as the inlet filler pipe 1 in the fuel feeding device for vehicles of Sixth Embodiment except for the position of the flexible element 5. The flexible element 5 is provided to the body part 12 and formed in a bellows shape. The flexible element 5 is provided to a position of the body part 12 that corresponds to the recess 4c, i.e., that faces the joint between the first split half 4a and the second split half 4b.

In the fuel feeding device for vehicles of Seventh Embodiment, although the recess 4c and the flexible element 5 are located differently, the flexible element 5 and the recess 4c make pressure contact and elastically engage with each other, similarly to the fuel feeding device for vehicles of Sixth Embodiment. Accordingly, the inlet filler pipe 1 is stably secured to the vehicle body 100 via the fixing member 4 in the fuel feeding device for vehicles of Seventh Embodiment, too.

Eighth Embodiment

Figure 13:
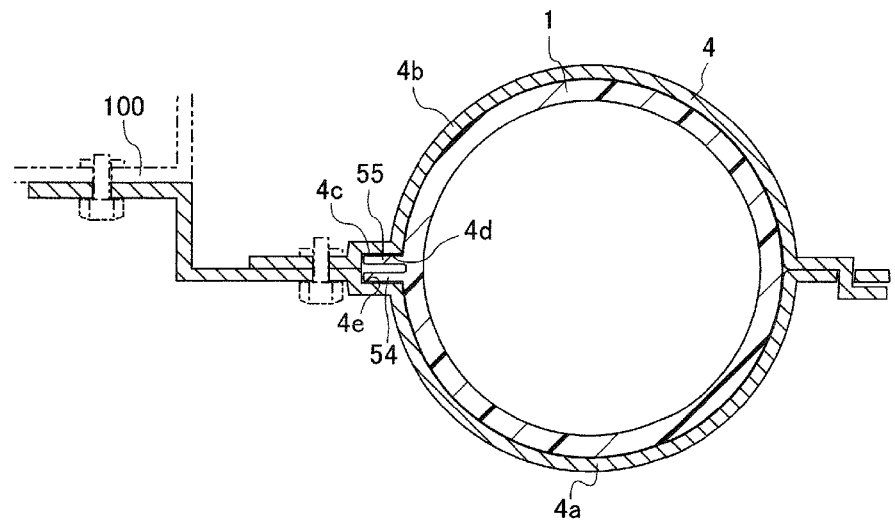
FIG. 13 is a schematic representation of a radial cross section of a fuel feeding device for vehicles according to Eighth Embodiment.

FIG. 13 is a schematic representation of a radial cross section of the fuel feeding device for vehicles according to Eighth Embodiment.

The fixing member 4 in the fuel feeding device for vehicles of Eighth Embodiment is generally the same as the fixing member 4 in the fuel feeding device for vehicles of Seventh Embodiment. Namely, the recess 4c in the fuel feeding device for vehicles of Eighth Embodiment is provided to extend across the first split half 4a and the second split half 4b of the fixing member 4. While the flexible element 5 has a protruding shape as with the flexible elements 5 in the fuel feeding devices for vehicles of Sixth Embodiment and Seventh Embodiment, it is not formed in the bellows shape. The flexible element 5 has two protrusions. The protrusions 54 and 55 each protrude radially outward from the inlet filler pipe 1. The flexible element 5 can elastically deform circumferentially such that the two protrusions 54 and 55 approach each other. The flexible element 5 is held in the recess 4c in a elastically deformed state. The two protrusions 54 and 55 move away from each other by elasticity inside the recess 4c and thus make pressure contact with two circumferential end faces 4d and 4e, respectively, which are the inner faces of the recess 4c. Therefore, in the fuel feeding device for vehicles of Eighth Embodiment, too, the flexible element 5 and the recess 4c make pressure contact and elastically engage with each other. Accordingly, the inlet filler pipe 1 is stably secured to the vehicle body 100 via the fixing member 4 in the fuel feeding device for vehicles of Eighth Embodiment, too.

Ninth Embodiment

Figure 14:
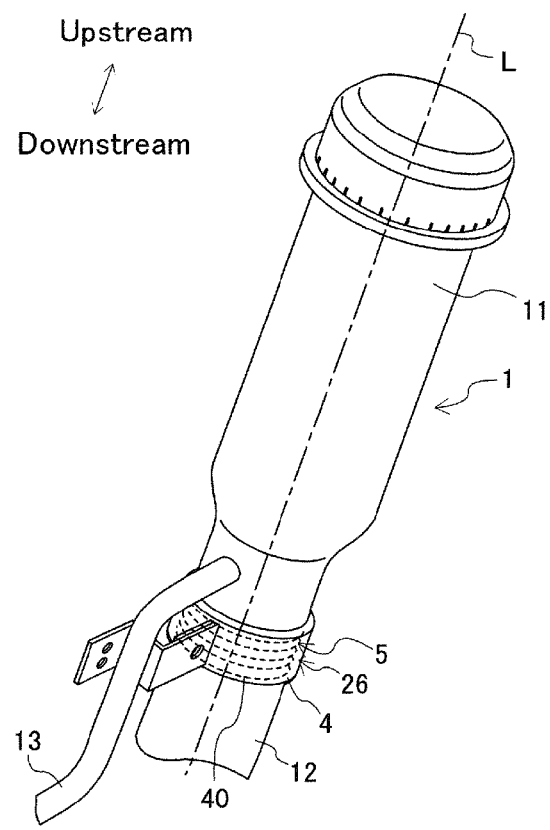
FIG. 14 is a schematic representation in an enlarged perspective view of major parts of a fuel feeding device for vehicles according to Ninth Embodiment.
Figure 15:
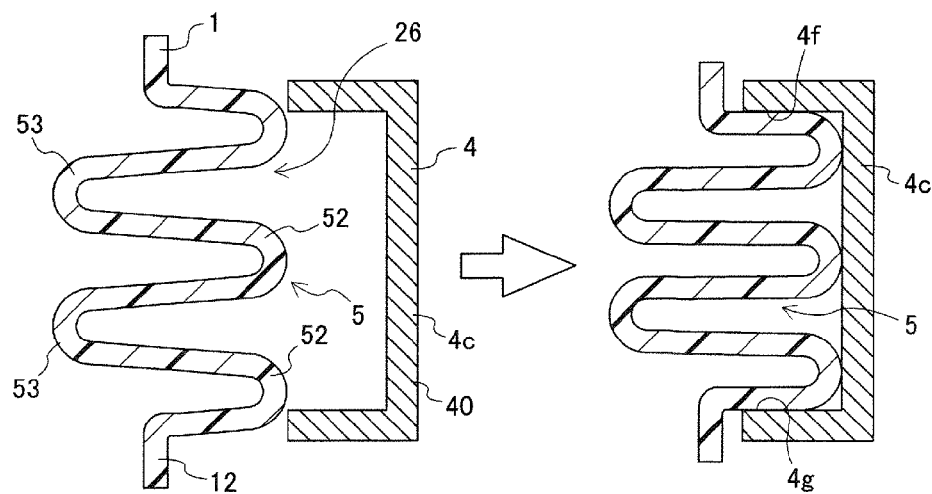
FIG. 15 is a schematic representation of an axial cross section of the fuel feeding device for vehicles according to Ninth Embodiment.

FIG. 14 is a schematic representation in an enlarged perspective view of major parts of a fuel feeding device for vehicles of Ninth Embodiment, and FIG. 15 is a schematic representation of an axial cross section of the fuel feeding device for vehicles of Ninth Embodiment.

The flexible element 5 in the fuel feeding device for vehicles of Ninth Embodiment is provided to the body part 12 of the inlet filler pipe 1 similarly to the flexible elements 5 in the fuel feeding devices for vehicles of Sixth Embodiment and Seventh Embodiment, but, unlike the latter, the flexible element can elastically deform axially, and hardly undergoes radial elastic deformation. Namely, while the flexible elements 5 in the fuel feeding devices for vehicles of Sixth Embodiment and Seventh Embodiment have a bellows shape wherein ridges 52 and valleys 53 are alternately arranged in the circumferential direction of the inlet filler pipe 1, the flexible element 5 in the fuel feeding device for vehicles of Ninth Embodiment has a bellows shape that extends axially wherein the ridges 52 and valleys 53 alternate in the axial direction of the inlet filler pipe. The flexible element 5 is provided around the entire circumference of the body part 12 as indicated by the broken lines in FIG. 14, thereby forming one axial region of the body part 12. Accordingly, the flexible element 5 forms the entire attachment area 26.

The fixing member 4 is generally the same as the fixing members 4 in the fuel feeding devices for vehicles of Sixth Embodiment to Eighth Embodiment except that the entire ring portion 40 is the recess 4c. The recess 4c, or the ring portion 40, has a ring groove that opens radially inward. Therefore, an axial cross section of the recess 4c is substantially U-shaped as shown in FIG. 15. The axial length of the flexible element 5 in its natural state is larger than the axial length of the recess 4c, as shown on the left side of FIG. 15. The flexible element 5 is held in the recess 4c in an axially compressed and elastically deformed state, as shown on the right side of FIG. 15. The flexible element 5 makes pressure contact with the axial end faces 4f and 4g of the recess 4c by its own elasticity. Therefore, in the fuel feeding device for vehicles of Ninth Embodiment, too, the flexible element 5 and the recess 4c make pressure contact and elastically engage with each other. Thus, the inlet filler pipe 1 is stably secured to the vehicle body (not shown) via the fixing member 4 in the fuel feeding device for vehicles of Ninth Embodiment, too.

The entire body part 12 may be formed in a bellows shape, in which ridges 52 and valleys 53 alternate in the axial direction of the inlet filler pipe, and the flexible element 5 may be formed of only an axial portion of this body part 12. In this case, as the body part 12 is formed in a bellows shape, the body part 12 can freely deform three-dimensionally, so that the inlet filler pipe 1 may be provided with a complex three-dimensional shape. This will improve the degree of freedom in installing the inlet filler pipe 1.

The flexible element 5 may be provided to a breather 13. As shown in FIG. 14, the breather 13 forms a passage for releasing gas, which diverges from the body part 12 or the inlet part 11 of the inlet filler pipe 1. If the flexible element 5 is to be provided to the breather 13, the flexible element 5 on the breather 13 may be brought into pressure contact with the fixing member 4 so as to press the fixing member 4 against the inlet filler pipe 1. Alternatively, the breather 13 and the inlet filler pipe 1 may both be accommodated and held in the fixing member 4 such that the flexible element 5 on the breather 13 presses the inlet filler pipe 1 on the inner circumference of the fixing member 4, so as to bring the inlet filler pipe 1 into pressure contact with the fixing member 4. The flexible element 5 may be provided to the breather 13 in various ways other than these examples for bringing the inlet filler pipe 1 into pressure contact with the fixing member 4.

(Others)

The present invention is not limited to the embodiments described above and shown in the drawings, but may be changed as required without departing from the scope of its subject matter. The invention may be carried out by freely selecting and combining various constituent elements shown in the embodiments.

INDUSTRIAL APPLICABILITY

The fuel feeding device for vehicles of the present invention can be mounted in various vehicles such as automobiles.

What is claimed is:

1. A fuel feeding device for vehicles comprising:
an inlet filler pipe made of resin and having a fuel supply passage;
a fixing member that secures said inlet filler pipe to a vehicle body; and
a flexible element that relatively presses said inlet filler pipe toward said fixing member by undergoing elastic deformation to bring said inlet filler pipe into pressure contact with said fixing member, wherein
said flexible element presses one or both of said inlet filler pipe and said fixing member in a direction away from said flexible element,
said inlet filler pipe and said fixing member contact each other on a front side or a back side in a pressing direction of said flexible element,
said inlet filler pipe comprises a pipe body having said fuel supply passage, and a collar separate from said pipe body and attached to outside of said pipe body, and
said flexible element is integral with said collar and relatively presses said pipe body toward said fixing member.

2. A fuel feeding device for vehicles comprising:
an inlet filler pipe made of resin and having a fuel supply passage;
a fixing member that secures said inlet filler pipe to a vehicle body; and
a flexible element that relatively presses said inlet filler pipe toward said fixing member by undergoing elastic deformation to bring said inlet filler pipe into pressure contact with said fixing member, wherein
said flexible element forms part of one of said inlet filler pipe and said fixing member,
said flexible element itself makes pressure contact with the other one of said fixing member and said inlet filler pine,
said flexible element includes at least one protrusion that protrudes in a radial direction of said inlet filler pipe and elastically deforms circumferentially or axially, and
said inlet filler pipe and said fixing member include a recess for holding said flexible element in an elastically deformed state.

3. A fuel feeding device for vehicles comprising:
an inlet filler pipe made of resin and having a fuel supply passage;
a fixing member that secures said inlet filler pipe to a vehicle body; and
a flexible element that relatively presses said inlet filler pipe toward said fixing member by undergoing elastic deformation to bring said inlet filler pipe into pressure contact with said fixing member, wherein
said flexible element forms part of one of said inlet filler pipe and said fixing member,
said flexible element itself makes pressure contact with the other one of said fixing member and said inlet filler pipe, and
said flexible element is formed of part of said inlet filler pipe in the form of bellows.

* * * * *